Patented July 26, 1938

2,124,879

UNITED STATES PATENT OFFICE 2,124,879

VACUUM DISTILLATION PROCESS

Kenneth C. D. Hickman, Rochester, N. Y., assignor to Eastman Kodak Company, Rochester, N. Y., a corporation of New Jersey No Drawing. Application November 21, 1936, Serial No. 112,139

7 Claims. (Cl. 202—52)

This invention relates to improvements in vacuum distillation and especially to the high vacuum distillation of low vapor pressure organic compounds.

In my U. S. application #67,332 filed March 5, 1936 I have disclosed an improved method of high vacuum distillation whereby the nature of distillates being obtained during distillation can be easily determined. The process involves adding one or more indicators to the material to be vacuum distilled, the indicator being one which distills at a temperature having a known relation to that of the particular fraction or fractions disired. This procedure constitutes an improvement over prior vacuum distillation processes since it enables positive and accurate separation of fractions containing the desired constituent.

This invention has for its object to improve the above described process. Another object is to provide an improved process of vacuum distillation of the nature described above which will enable the use of smaller amounts of indicating substances. Another object is to provide a process whereby the nature of distillates being obtained in a high vacuum or molecular distillation process can be determined without adding an indicator to the entire material being distilled. A further object is to provide distillate fractions produced by the use of indicating substances which are themselves free from the indicators. Other objects will appear hereinafter.

These and other objects are accomplished by my invention which comprises adding one or more indicators to a small amount of the material to be distilled and distilling this mixture under approximately the same conditions as those which will be used to distil the main bulk of the material. This pilot distillation using indicators distilling at temperatures having a known relation to the distilling temperatures of the desired fraction or fractions will enable one to determine at what temperature or over what temperature range the desired fractions are being obtained. Subsequently distillation is performed on the main bulk of the material under similar conditions to those used in the pilot experiment, and the desired fractions can be collected at the temperatures indicated by the information derived from the pilot experiment. The necessity of using an indicator for the main bulk is thus avoided.

As explained in my application referred to above, high vacuum and especially molecular distillation differs from ordinary distillation in that substances exhibit no definite boiling point. A boiling point is the temperature at which the vapors of a substance overcome the pressure of the atmosphere. When the atmosphere is entirely pumped away as in molecular distillation, distillation can occur at any temperature. If the temperature is raised, the rate of distillation increases correspondingly. The rate of distillation varies not only with temperature but with differences in apparatus such as area of evaporating surface, with the degree of resistance to passage of the vapor and with changes in composition of the distilland. Although temperature is not an accurate guide under all conditions it has been found that where a large number of substances are present in the material distilled, they will distill in a certain relative order irrespective of these variables. Expressed in another way, as described in detail in my previous application, the elimination maxima of a mixture of substances occur in a fixed relative order characteristic of the substances. Therefore, if this order is established by a preliminary distillation in one type of apparatus, the same order will be maintained during distillations of the same material during other distillations in the same or different apparatus. This method of operation necessitates only the use of indicators on small amounts of the material and is therefore an advantage over the procedure disclosed in my above mentioned application. Also by determining the temperature of distillation by means of a preliminary distillation, the bulk may be distilled and the same fractions collected at the same temperatures if similar conditions are used. This procedure has apparent advantages when large amounts of the same or similar material are to be distilled.

The preliminary or pilot distillation may be done in two ways. The indicator such as a dye may be added to the first lot of distilland passed through a large industrial vacuum still. When the temperatures of the various distilling columns have been properly adjusted so that desired fractions as indicated by the dye are being separated, the supply of distilland containing the dye is replaced by the distilland in which there is no indicator and the collection of fractions continued under substantially the same conditions.

An alternative method is to perform the preliminary distillation with a small quantity of the material to be distilled. The proper dyes are added to the sample and the distillation carried out in a small laboratory still such as for instance of a type similar to that disclosed in my application #75,163 filed April 18, 1936. The temperature data thus obtained can be used to carry out the distillation of the bulk of the material in another, but larger still without the use of indicators. This method is only qualitative since the difference in sizes of the two stills has an effect upon the temperature of distillation. However the relative masses of the fractions obtained at corresponding temperatures or over corresponding temperature ranges are quantitative and reproducible. This method can therefore be made quantitative by measuring the volume of the desired fractions obtained in the pilot distillation and collecting a proportionate volume as a corresponding fraction in the large still in which no indicator is used. This expedient can also be used with advantage in the method disclosed above. In all methods disclosed, pilot dyes are used in the preliminary distillation and are not used in the distillation of the main bulk of the distilland. The preliminary distillation need not necessarily be carried out using valuable oil containing valuable constituents. A crude, rancid or residue oil of the same type or species can be used.

In most commercial distillations it is desirable to redistill fractions in order to obtain a sharp separation or fractionation. When many fractions are combined and redistilled it is next to impossible to predict in which of the final fractions the desired component or components will appear. If a preliminary distillation with an indicator is performed, the temperature and order of distillation of the desired components can be easily determined.

When distilling a mixture containing several components which are to be recovered as individual fractions, the maximum distillation temperature of each can be determined and the relation or relative order between these will persist in all subsequent distillations even though the temperature range as a whole will vary. In such a case it is only necessary to determine the maximum distillation temperature of one fraction in order to know the maximum distillation temperatures of each of the desired fractions.

*Example*

1,000 gallons of a certain lot of cod liver oil is to be distilled in a large multi unit molecular still. It is desired to remove vitamin A in the alcohol form from the second column and vitamin D in free form from the third column. Two dyes are added to the first portion of the oil entering the still, one being "Celanthrene Red 3B" which distills with vitamin A alcohol and the other being dipropyl-diamino-anthraquinone which distills at approximately the same temperature as vitamin D in free form. The temperature of the second and third columns are adjusted so that the fraction obtained from the second column is colored pink or red and that from the third column is colored blue. Ten parts of each dye per million of cod liver oil are sufficient. After the temperature of the columns have thus been adjusted, oil free of indicators is run into the still and fractions collected in the same manner as when the dyes were employed.

Instead of using indicators having a distillation point matching that of the desired fraction, indicators may be used having a distilling point different from that of the fraction, the difference being a known quantity. Similarly two bracketing indicators may be used one distilling below and the other above the desired fraction. In distilling higher vapor pressure materials at higher pressures, indicators of correspondingly higher vapor pressure will be used. "Para Red" and p-nitroso-dimethyl aniline are examples of indicators having sufficient volatility to be used in distillations not of the molecular type, such as distillations carried out in wide-necked flasks at pressures of from about .01 mm. to 1. mm. Hg.

The distillation conditions and method of carrying out the pilot distillation are the same as those disclosed in my application referred to above in which the indicator is added to the whole bulk of material distilled. Reference is therefore made to that application for a full and complete disclosure of the distillation conditions, method of selecting indicators and for examples of suitable indicators.

While I have described my invention by reference to specific materials, it is broadly applicable to the distillation of all substances amenable to vacuum and especially high vacuum distillation. For instance it is useful in the vacuum distillation of vegetable and animal oils such as fish body or liver oils to recover concentrated distillates of fat soluble vitamins. Examples of such oils are, tuna, halibut, salmon, mackerel, etc. liver oils, sardine, herring, menhaden, etc. fish body oils. Other examples to which the process is applicable are the vacuum distillation and especially molecular distillation of hydrocarbon and glyceride oils, crude mixtures containing sterols, hormones, enzymes, etc.

My invention is applicable to vacuum distillation processes in general, particularly those taking place under a high vacuum such as at below 1 mm. It is of especial value in high vacuum, short path types of distillation which are characterized by the fact that the distillate is condensed at a short distance from the evaporating surface. Where this distance is less than about the mean free path the process is known as molecular distillation and it is in this particular field that my invention is of greatest importance.

By the term indicator as used in the specification and claims I intend to designate a substance whose presence in the distillate is readily made known by its chemical or physical properties such as color, light refractive properties, radioactivity, tendency to crystallize, etc.

What I claim is:

1. In the process of high vacuum, short path distillation of organic substances, the step of determining the temperature at which the desired fraction should be collected by carrying out a preliminary distillation on a small portion of the distilland to which has been added a non-reactive organic compound whose presence in the distillate is immediately made known by its chemical or physical properties, which organic compound distills in maximum amounts at a temperature having a known relation to that temperature at which the desired fraction distills in maximum amounts.

2. In a process of high vacuum distillation of an organic substance the steps which comprise adding to a portion of the bulk of a mixture to be distilled, at least one non-reactive colored substance which distills in maximum amounts at a temperature having a known relation to that temperature at which the fraction to be separated from the organic substance distills in maximum amounts, subjecting this mixture to high vacuum distillation, determining at what temperature the desired component distills, subjecting the main bulk of the organic substance to distillation under similar conditions to those used in the first distillation and collecting a fraction at the temperature determined in the first distillation.

3. In a process of high vacuum distillation of an organic oil the steps which comprise adding to a portion of the bulk of a mixture to be distilled, at least one non-reactive colored substance which has a temperature of maximum distillation having a known relation to that of the component to be separated from the oil, subjecting this mixture to high vacuum distillation, determining at what temperature the desired fraction distills and its volume, subjecting the main bulk of the mixture to high vacuum distillation and collecting a fraction of proportionate volume at the temperature determined in the first distillation.

4. In a process of high vacuum distillation of vegetable or animal oils to obtain distillates of concentrated fat soluble vitamins the steps which comprise, adding to a portion of the entire bulk of the oil to be distilled at least one non-reactive organic compound whose presence in the distillate is immediately made known by its chemical or physical properties, which organic compounds distills in maximum amounts at a temperature having a known relation to that at which a vitamin contained in the oil distills in greatest amount, subjecting this mixture to high vacuum distillation, determining, by means of the distillation point of the organic compound, the temperature at which the vitamin distills, subjecting the main bulk of the oil to high vacuum distillation under substantially the same conditions used in the first distillation and collecting a vitamin fraction at the temperature determend in the first distillation.

5. In a process of high vacuum, short path distillation of vegetable or animal oils to obtain distillates of concentrated fat soluble vitamins the steps which comprise adding a non-reactive colored substance to a portion of the entire bulk of oil to be distilled, the colored substance being one distilling in maximum amounts at a temperature having a known relation to that at which a vitamin contained in the oil distills in greatest amount, subjecting this mixture to high vacuum, short path distillation, determining by means of the distillation point of the colored substance, the temperature at which the vitamin distilled, subjecting the main bulk of the oil to high vacuum, short path distillation under substantially the same conditions used in the first distillation and collecting the vitamin fraction at the temperature determined in the first distillation.

6. In a process of molecular distillation of vegetable or animal oils to obtain distillates of concentrated fat soluble vitamins, the steps which comprise adding at least one non-reactive dye to a portion of the entire bulk of the oil to be distilled, the dye being a substance distilling in maximum amounts at a temperature having a known relation to that at which a vitamin contained in the oil distills in greatest amount, subjecting this mixture to molecular distillation, determining by means of the distillation point of the dye the temperatures at which the vitamins distill, subjecting the main bulk of the oil to molecular distillation under substantially the same conditions and collecting vitamin fractions at the temperatures determined in the first distillation.

7. In a process of molecular distillation of fish oils to obtain distillates of concentrated fat soluble vitamins, the steps which comprise adding at least one non-reactive dye to a portion of the entire bulk of the oil to be distilled, the dye being a substance distilling in maximum amounts at a temperature having a known relation to that at which a vitamin contained in the oil distills in greatest amount, subjecting this mixture to molecular distillation, determining by means of the distillation point of the dye the temperature at which the vitamin distills, subjecting the main bulk of the oil to molecular distillation under substantially the same conditions and collecting a vitamin fraction at the temperature determined in the first distillation.

KENNETH C. D. HICKMAN.